US006859723B2

(12) United States Patent
Yokota

(10) Patent No.: US 6,859,723 B2
(45) Date of Patent: Feb. 22, 2005

(54) DISPLAY METHOD AND APPARATUS FOR NAVIGATION SYSTEM

(75) Inventor: Tatsuo Yokota, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 10/218,932

(22) Filed: Aug. 13, 2002

(65) Prior Publication Data

US 2004/0204833 A1 Oct. 14, 2004

(51) Int. Cl.[7] ............................................. G01C 21/00
(52) U.S. Cl. ....................... 701/201; 701/211; 701/212; 340/995.16
(58) Field of Search ................................. 701/201, 211, 701/212, 208; 340/995.14, 995.15, 995.16, 995.23, 995.27

(56) References Cited

U.S. PATENT DOCUMENTS

| 5,177,685 | A | * | 1/1993 | Davis et al. ............. 455/456.5 |
| 5,739,772 | A | | 4/1998 | Nanba et al. |
| 6,115,669 | A | * | 9/2000 | Watanabe et al. ........... 701/209 |
| 6,119,066 | A | | 9/2000 | Sugiura et al. |
| 6,121,900 | A | | 9/2000 | Takishita |
| 6,144,919 | A | * | 11/2000 | Ceylan et al. ............. 701/208 |
| 6,178,380 | B1 | | 1/2001 | Millington |
| 6,240,361 | B1 | | 5/2001 | Ise et al. |

FOREIGN PATENT DOCUMENTS

JP          09-210715        * 8/1997

* cited by examiner

*Primary Examiner*—Michael J. Zanelli
(74) *Attorney, Agent, or Firm*—Muramatsu & Associates

(57) ABSTRACT

A display method and apparatus for navigation system for specifying the destination easily and quickly. The navigation system is designed to enable a user to quickly select a street name and easily specify the address number of the destination through a map image of the selected street. The navigation system includes a menu for changing a keyboard screen or other input screen to a map screen showing the image of the selected street. A user can find a location of the destination on the image of the selected street. Various display methods are provided to promote quick and easy operations for finding the location on the selected street. When there are two or more streets having same street name with different street types or street prefixes, the navigation system displays selection means for a user to select one of the streets.

29 Claims, 13 Drawing Sheets

Fig. 2A
(Prior Art)
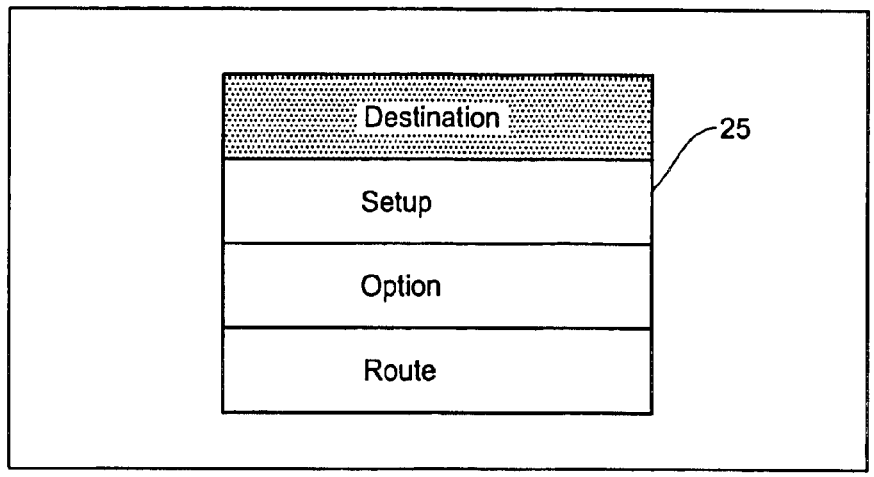
Fig. 2B
(Prior Art)
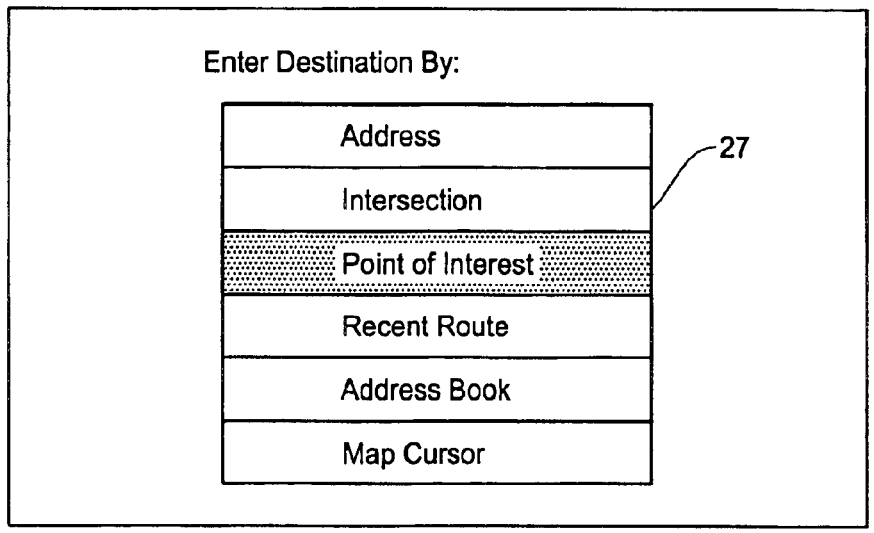
Fig. 2C
(Prior Art)
| Category List | 28 |
|---|---|
| Recreation | Input Category |
| Bank | Hotel |
| Emergency | Gas Station |
| Restaurant | Shopping |
| Travel | Automotive |
| Park | Theater |

Prior Art

Fig. 5A

| Dest | Find Destination by |
|---|---|
| Address | |
| Intersection | |
| Point of Interest | |
| Map Cursor | |
| Recent Route | |
| Address Book | |
| Today's Plan | |

Fig. 5B

| Dest | Find Address by |
|---|---|
| | |
| City Name | |
| Street Name | |

Fig. 5C

| Dest | Input Street Name |
|---|---|

GA

A B C D E F G H I J — Delete
K L M N O P Q R S T
U V W X Y Z & ' / -  — Space
1 2 3 4 5 6 7 8 9 0

GABACHO
GAHAHA
GANBA

Fig. 5D

| Dest | Input Address Number |
|---|---|

[        ] GABACHO

A B C D E F G H I J — Delete
K L M N O P Q R S T
U V W X Y Z & ' / -  — Done
1 2 3 4 5 6 7 8 9 0

Fig. 5E

| Dest | Input Address Number |
|---|---|

1220  GABACHO

A B C D E F G H I J — Delete
K L M N O P Q R S T
U V W X Y Z & ' / -  — Done
1 2 3 4 5 6 7 8 9 0

Fig. 5F

| Dest | Confirm Destination |
|---|---|

1220 GABACHO
LOS ANGELES, CA by Shortest Route method
OK to Proceed
Save in Address Book
Add to Today's Plan

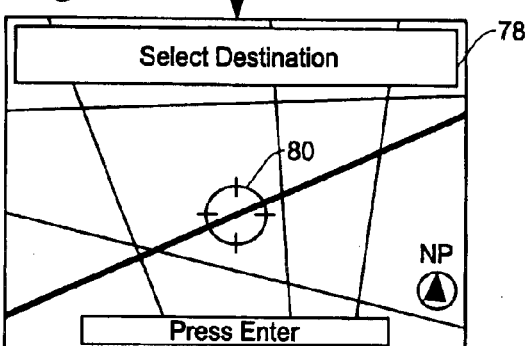

Fig. 7A

| Dest | Input Street Name |
|---|---|
| GA | |

| A B C D E F G H I J | Delete |
| K L M N O P Q R S T | |
| U V W X Y Z & ' / - | Space |
| 1 2 3 4 5 6 7 8 9 0 | |

GABACHO
GAHAHA
GANBA

Fig. 7B

| Dest | Select Street Name |
|---|---|

GABACHO Ave.
GABACHO Blvd.
GABACHO Rd.
GABACHO St.

Fig. 7C

| Dest | Input Address Number |
|---|---|
| | GABACHO St. |

Range 2000 - 5699    Map

| A B C D E F G H I J | Delete |
| K L M N O P Q R S T | |
| U V W X Y Z & ' / - | Done |
| 1 2 3 4 5 6 7 8 9 0 | |

Fig. 8A

| Dest | Input Street Name |
|---|---|
| GA | |

| A B C D E F G H I J | Delete |
| K L M N O P Q R S T | |
| U V W X Y Z & ' / - | Space |
| 1 2 3 4 5 6 7 8 9 0 | |

GABACHO
GAHAHA
GANBA

Fig. 8B

| Dest | Select Street Name |
|---|---|

N. GABACHO
S. GABACHO
E. GABACHO
W. GABACHO

Fig. 8C

| Dest | Input Address Number |
|---|---|
| | S. GABACHO |

Range 2000 - 5699    Map

| A B C D E F G H I J | Delete |
| K L M N O P Q R S T | |
| U V W X Y Z & ' / - | Done |
| 1 2 3 4 5 6 7 8 9 0 | |

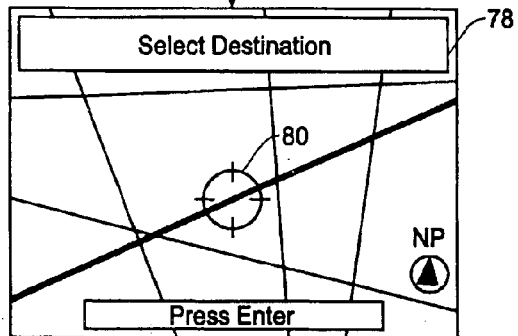
Fig. 9A
Fig. 9B
Fig. 9C
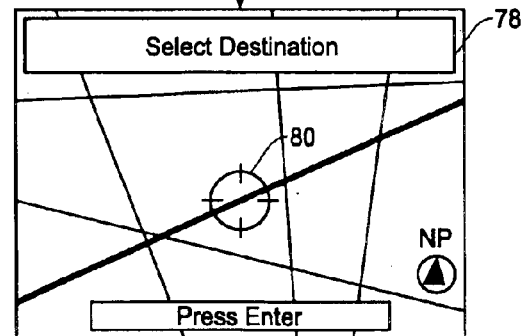
Fig. 10A
Fig. 10B
Fig. 10C

DISPLAY METHOD AND APPARATUS FOR NAVIGATION SYSTEM

FIELD OF THE INVENTION

This invention relates to a display method and apparatus for navigation system, and more particularly, to a display method and apparatus which is capable of easily specifying an address of a destination in a navigation system through a map image of a selected street.

BACKGROUND OF THE INVENTION

A navigation system performs travel guidance for enabling a user to easily reach the selected destination. A typical example is a vehicle navigation system. The present invention is not limited to a vehicle navigation system but is applicable to other types of navigation system such as a PDA (Personal Data Assistant), a cellular phone, and other portable navigation devices. However, for the convenience of explanation, the following description is made mainly for the vehicle navigation system.

Such a navigation system detects the position of the vehicle, reads out map data pertaining to an area at the vehicle current position from a data storage medium, for example, a CD-ROM (compact disc read-only memory) or a DVD (digital versatile disc), and displays a map image on a monitor screen (display) while superimposing a mark representing the current location of the vehicle on the map image. Alternatively, such map data can be provided to the vehicle from a remote server through a communication network such as Internet.

The vehicle position is determined by a self-contained navigation sensors (e.g. a distance traveled sensor and a bearing sensor) mounted in the vehicle or by a global positioning system (GPS) including an artificial satellite (satellite navigation). The satellite enables absolute position detection and higher position accuracy than the self-contained navigation sensors. However, the satellite navigation involves problem of position detection failure such as in a tunnel or a building where the satellite radio signals are obstructed. Therefore, recent navigation systems utilize both self-contained navigation and satellite navigation to achieve improved performances.

As the present position of the vehicle changes with the travel of the vehicle, the vehicle current position mark in the map image on the screen is changed accordingly. Alternatively, the map is scrolled while the vehicle current position mark is fixed at a predetermined position, for example, at the center of the image. In either method, the navigation system enables the driver to recognize the map information of the area at the vehicle position at a glance.

When a destination is not set, such a navigation system functions as a locator map which indicates the current location of the vehicle on a map image. When the destination is set, the navigation system starts a route guidance function for setting a guided route from the starting point to the destination. Typically, the route guidance function performs an intersection guidance process in which a monitor screen displays an enlarged intersection diagram and the direction in which the vehicle is to travel while displaying the guide route on a map. When a destination is input, a CPU in the navigation system determines a most suitable guided route from the current vehicle position to the destination and successively stores nodes (expressed in longitude and latitude) constituting the guided route in a memory.

During actual traveling, the node series stored in the memory is searched for a portion of the guided route to be displayed in a map display area of the monitor screen, and the portion of the guided route is highlighted so as to be discriminable from other routes. When the vehicle is within a predetermined distance of an intersection it is approaching, an intersection guidance diagram (an enlarged or highlighted intersection diagram with an arrow indicating the direction in which the vehicle is to turn at the intersection) is displayed to inform a driver of the desired one of roads or directions selectable at the intersection.

FIG. 1A shows an example of a locator map display containing a vehicle current position mark VCP on a map image 21. Typically, a navigation system shows the street on which the vehicle is running in the map image 21 and a name of the street such as "W 190TH ST" in an information box 23 on the monitor screen. Other information such as a north pointer NP, a map scale and a current time may also be illustrated on the display screen. In this manner, the locator map display shows the current position of the vehicle on the map image, however, it does not perform the route guidance function because the destination is not set in the navigation system.

FIG. 1B shows an example of route guidance display which performs the route guidance function. The route guidance display is activated after specifying the destination. In addition to the map image 21 similar to the locator map of FIG. 1A, this example shows further an arrow indicating the direction (left) in which the vehicle is to turn at the intersection in a guidance information box 22 at the top of the screen. The guidance information box 22 also shows a name of the street "PRAIRIE AVE" which intersects with the current street "W 190TH ST" and a distance to the intersection. Thus, the navigation system indicates that the vehicle should make a left turn at the intersection with "PRAIRIE AVE".

Typically, the current street "W 190TH ST" and the left side of the street "PRAIRIE AVE" will be highlighted in the map image 21. Further, such route guidance is accompanied by voice instructions. If the direction of travel in the next intersection is left, the navigation system gives spoken guidance such as "turn left at the next intersection". In this example, an information box 24 at the bottom of the display screen includes information regarding the remaining distance to the final destination and an estimated time to reach the final destination.

In order to be guided by the route guidance mode such as shown in FIG. 1B, a destination must be specified in the navigation system so that the system can find one or more routes to get to the destination. FIGS. 2A–2F show examples of display shown on the monitor screen during the operation of inputting the destination.

By operating a menu key, a main menu 25 such as shown in FIG. 2A is displayed on the navigation system and a menu item "Destination" is selected from the main menu. This allows the navigation system to display a "Enter Destination by" menu 27 as shown in FIG. 2B for specifying an input method for selecting the destination. The "Enter Destination by" menu 27 lists various methods for selecting the destination including "Address" for specifying the city and address of the destination, "Intersection" for specifying the names of two streets in the city which intersect with one another, and "Point of Interest" for selecting the programmed destination based on the name, category or telephone number.

Other methods in the "Enter Destination by" menu 27 include "Recent Route" for specifying the destination based on the recent destinations saved in the navigation system, "Address Book" for selecting the address of the destination out of the addresses stored in the system, and "Map Cursor" for specifying the destination by pointing a cursor to the destination on the map. For example, the information in the address book is formed of a list of names and addresses of the places that the driver frequently visits.

When selecting, for example, the "Point of Interest" in FIG. 2B, the navigation system displays a "Category List" menu 28 such as shown in FIG. 2C. The "Category List" menu 28 contains various different categories such as 37 Bank", "Restaurant", "Hotel", "Shopping" and others. Supposing the category "Shopping" is selected, the navigation system displays "Name List" such as shown in FIGS. 2D and 2E. The "Name List" shows names of shops and shopping malls sorted by, for example, distance from the vehicle. In an address information box 31 on the display, the address and phone number of the highlighted name in the list 33 will be displayed. The address information box 31 may also show the distance to the highlighted shop. Typically, the navigation system stores several tens or hundreds of names of shops within predetermined distances and displays several shops per page of display screen, and a user may scroll the display screen to see other names of shops in the name list 36 such as shown in FIG. 2E.

When the destination is not prestored in the navigation system, a user can input the destination by selecting, for example, the "Address" method or "Intersection" method in the "Enter Destination by" menu 27 of FIG. 2B. Then, the navigation system displays an "Enter Street Name" shown in FIG. 2F for inputting the city and address in an address input box 37 by means of a keyboard (keypad) 38 displayed on the monitor screen.

After inputting the destination, the navigation system determines a route to the destination based on, for example, the shortest way to reach the destination, the route preferring freeways to surface roads, or the route without using toll road, and the like. Thus, the navigation system moves to the route guidance display such as shown in FIG. 1B which performs the route guidance.

In the process of specifying the destination, there is a case where a user is familiar with his destination on a map image of a particular street although he may or may not know the address number of the street. Sometimes, a user is able to pin-point his destination on the map image even though he does not know the address number. Suppose the particular address has never been used in the system and therefore not listed in the "Address Book" or "Recent Route" (FIG. 2B) for quick reuse, the user has to specify the address of the destination through the keyboard such as shown in FIG. 2F. This input method takes time and may adversely affect the safe driving.

Therefore, in such a case, rather than hitting the keyboard one by one, for specifying the street name and address number, the user wants a quicker way to specify the destination address through the map image. For example, in many navigation systems currently in the market, a user can find a point of interest (POI) on the map image by pointing the cursor (marker) on the particular POI. Then, the navigation system displays confirmation screen which shows the street name and address number of the cursor point. This process is quicker to input the street name than that using the keyboard.

In some cases, it is easier for the user to specify the destination on the position on the map even though he does not know the address number. In other cases, a user want to go to a place based on a map image such as a park or a lake, etc., without knowing a place name or an address of the place. In the conventional navigation system, however, it is not designed to easily and quickly display the street image or easily change the location on the street image. Therefore, there is a need for a navigation system which can easily and quickly change the navigation screen to a map image of the intended street to find and specify the destination on the street.

SUMMARY OF THE INVENTION

It is, therefore, an object of the present invention to provide a navigation system which enables a user to easily and quickly change the navigation system to a map image for finding and specifying a destination on the map image.

It is another object of the present invention to provide a navigation system which enables a user to easily and quickly find a position on the selected street on the map screen for specifying the destination.

It is a further object of the present invention to provide various display methods for promoting easy and quick operations for selecting an address number of the destination on the map image.

In the present invention, the navigation system is designed to enable a user to quickly select a street name and easily specify the address number of the destination. The navigation system includes a menu for changing a screen for inputting the address number to a map image of the selected street. By selecting the specific position on the selected street by a cursor point, the address of the destination can be easily and quickly specified because it is not necessary to input the address number through the keyboard.

More specifically, the method of the present invention includes steps of: displaying a keyboard for inputting a street name of a destination, displaying a street name specified by a user and a map menu for changing a current screen to a map screen, changing the current screen to the map screen which displays an image of the street selected by the user and a cursor as a pointing device, and finding a position on the image of the selected street and pointing the position on the selected street by the cursor, thereby determining an address of the destination. When there are two or more streets having same street name with different street types or street prefixes, the navigation system displays selection means for a user to select one of the streets.

Another aspect of the present invention is a display apparatus for a navigation system. The display apparatus is configured by various means for achieving the display methods described above which utilizes the map menu for changing the address number of the cursor point address specified on the map screen.

According to the present invention, the vehicle navigation system enables the user to determine the destination easily and quickly. First, the user selects the particular name of the street on the keyboard, then changes to the map screen displaying the image of the selected street. The user is able to find a position on the selected street in the map screen to determine the specific address of his destination.

The navigation system of the present invention enables the user to easily and quickly change the navigation system to the map image of the selected street for finding and specifying the destination on the map image. The user can easily and quickly find a position on the map image of the selected street. The various display methods provided in the navigation system promote easy and quick operations for selecting the destination on the map image.

BRIEF DESCRIPTION OF THE DRAWINGS

FIGS. 2A–2F are schematic diagrams showing display examples of a navigation system. FIG. 2A is a main menu, FIG. 2B is a destination set menu, FIG. 2C shows a list of category when setting a point of interest, FIGS. 2D and 2E show name list in the category specified in FIG. 2C, and FIG. 2F shows a keyboard display for entering the street name of address or intersection.

FIGS. 5A–5F are display examples showing a typical process for specifying a destination in the conventional navigation system using a keyboard image.

FIGS. 6A–6F are display examples showing a process for specifying a destination using keyboard and map images in the navigation system of the present invention.

FIGS. 7A–7C are display examples showing a process for specifying a destination in the navigation system of the present invention where two or more streets with the same street name but different types are involved.

FIGS. 8A–8C are display examples showing a process for specifying a destination in the navigation system of the present invention where two or more streets with the same street name but different prefixes are involved.

FIGS. 9A–9C are display examples showing an example of process for selecting a range of a street image for specifying a destination in the navigation system of the present invention.

FIGS. 10A–10C are display examples showing another example of process for selecting a range of a street image for specifying a destination in the navigation system of the present invention.

DETAILED DESCRIPTION OF THE INVENTION

The navigation system of the present invention is designed to enable a user to specify the destination quickly when the user is familiar with the map associated with a particular destination. In accordance with the present invention, a user such as a driver can quickly specify the street name and address number and find an exact location of his destination on the street through the map image. Examples of operation process and display screen in the present invention are shown in FIGS. 6–15.

Figure 3:
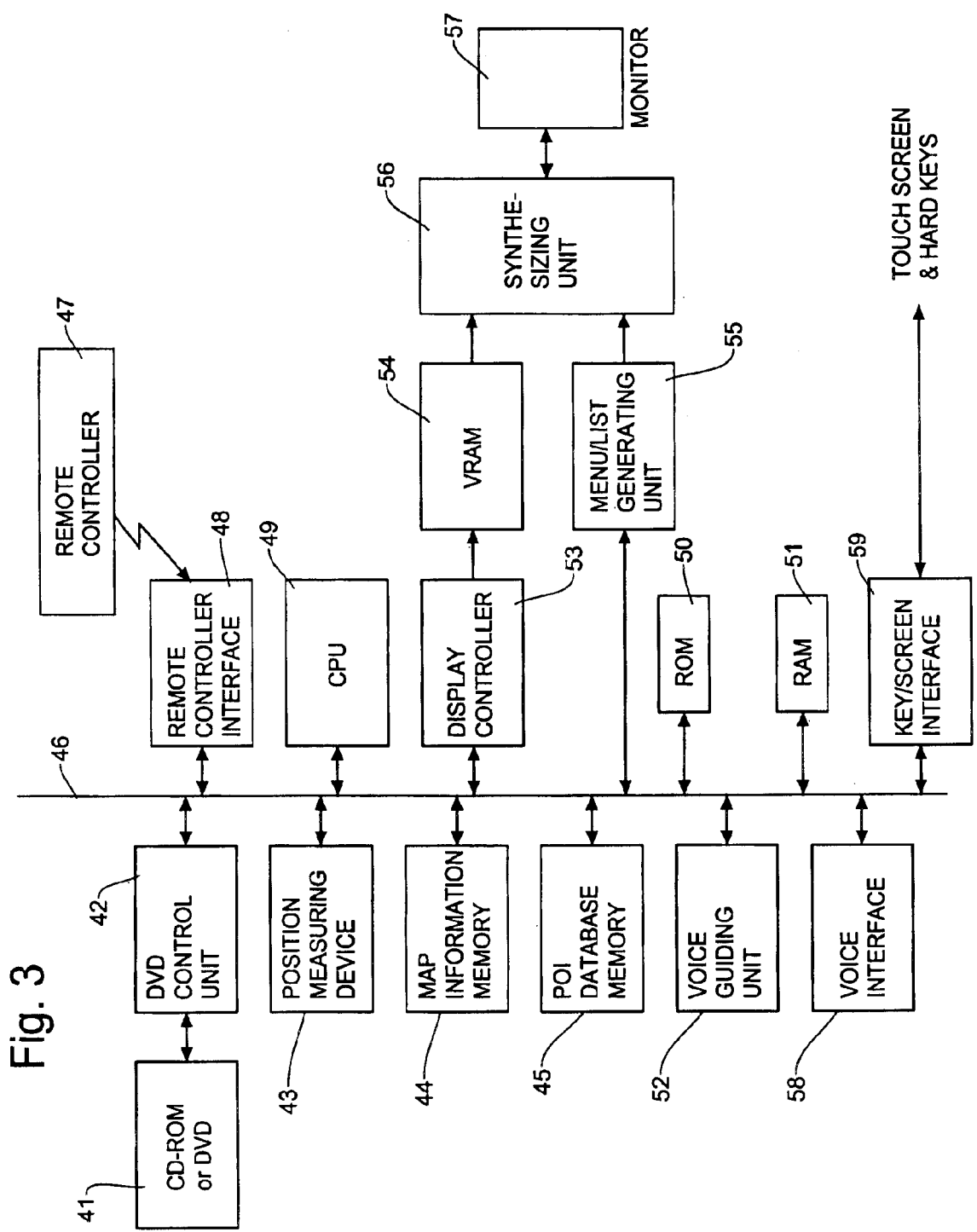
FIG. 3 is a block diagram showing an example of structure in the navigation system according to the present invention.
Figure 4A:
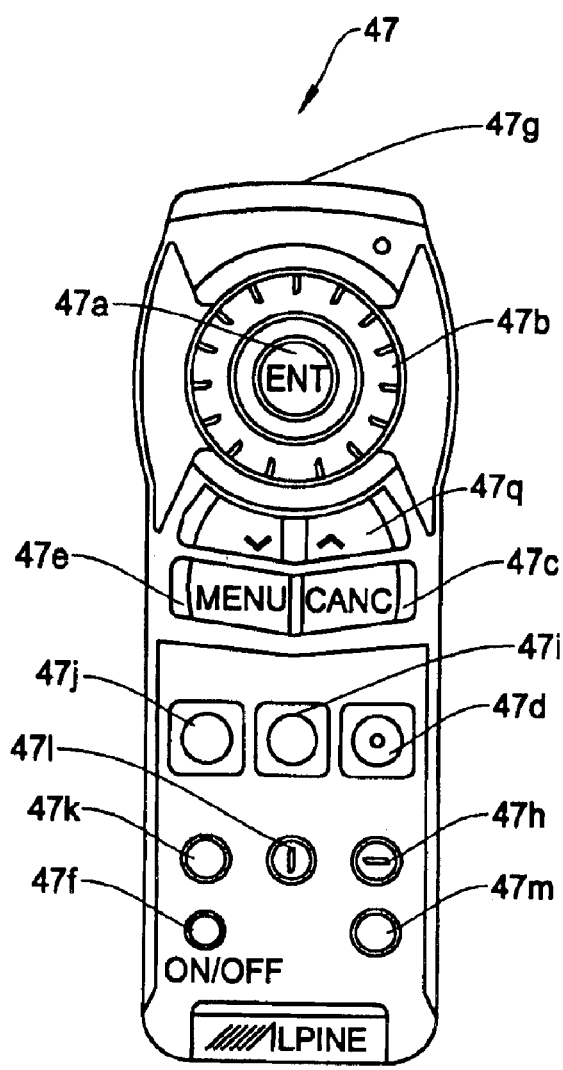
FIGS. 4A and 4B are diagrams showing an example of a remote controller accompanied by the navigation system of the present invention.
Figure 4B:
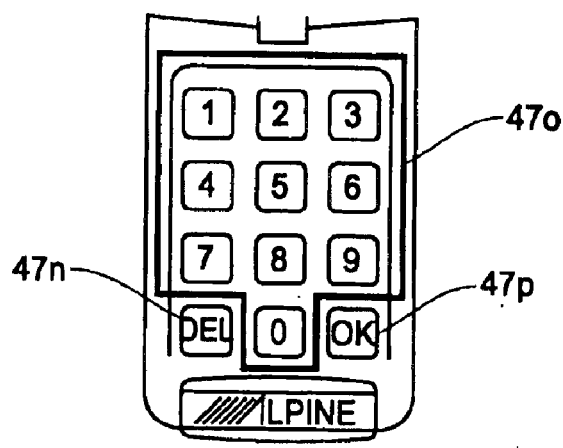

Before going into details of the display examples of FIGS. 6–15, a brief description is made regarding the basic structure of the navigation system with reference to FIG. 3 and an example of remote controller for the navigation system with reference to FIGS. 4A and 4B. Further, to facilitate a better understanding of the present invention, a typical process and display examples for specifying a destination in the conventional technology will be explained with reference to FIGS. 5A–5F.

In the block diagram of FIG. 3, the navigation system includes a map storage medium 41 such as a CD-ROM, DVD, HDD (hard disc drive or other storage means (hereafter "DVD") for storing map information, a DVD control unit 42 for controlling an operation for reading the map information from the DVD, a position measuring device 43 for measuring the present vehicle position. The position measuring device has a vehicle speed sensor for detecting a moving distance, a gyroscope for detecting a moving direction, a microprocessor for calculating a position, a GPS receiver, and etc.

The block diagram of FIG. 3 further includes a map information memory 44 for storing the map information which is read out from the DVD 41, a database memory 45 for storing database information such as point of interest (POI) information which is read out from the DVD 41, a remote controller 47 for executing a menu selection operation, an enlarge/reduce operation, a destination input operation, etc. and a remote controller interface 48.

The remote controller 47 has a variety of function keys as shown in FIG. 4A and numeric keys as shown in FIG. 4B. The numeric keys appear when a lid in the lower part of FIG. 4A is opened. The remote controller 47 includes a joystick/enter key 47$a$, a rotary encoder 47$b$, a cancel key 47$c$, an MP/RG key 47$d$, a menu key 47$e$, a zoom/scroll key 47$q$, a monitor ON/OFF key 47$f$, a remote control transmitter 47$g$, a plan key 47$h$, an N/H key 47$i$, a voice key 47$j$, a list key 47$k$, a detour key 47$l$, a delete destination key 47$m$, a delete key 47$n$, numeric keys 47$o$, and an OK key 47$p$.

The joystick/enter key 47$a$ selects highlighted items within the menu and moves map displays and a vehicle position icon. The rotary encoder 47$b$ changes zoom scale, scrolls list pages, moves the cursor, and etc. The cancel key 47$c$ cancels the present displayed screen or is operated when returning the screen to the previous menu screen. The MP/RG key 47$d$ toggles between detailed map display and basic guide display during guidance. The menu key 47$e$ displays the main menu. The plan key 47$h$ starts the guidance to the route set by Today's Plan function, the N/H key 47$i$ changes between North-up and Heading-up orientation, and the voice key 47$j$ initiates voice instruction.

Although a remote controller such as described above is a typical example for selecting menus, executing selected functions and etc., a navigation system may include various other input methods to achieve the same and similar operations done through the remote controller. For example, the navigation system includes hard keys and joystick on a head unit of the system mounted on a dash board, touch screen, and voice communication.

Referring back to FIG. 3, the navigation system further includes a bus 46 for interfacing the above units in the system, a processor (CPU) 49 for controlling an overall operation of the navigation system, a ROM 50 for storing various control programs such as a route search program and a map matching program necessary for navigation control, a RAM 51 for storing a processing result such as a guide route, a voice guiding unit 52 for guiding a traveling direction at a crossroad with spoken instructions, a display controller 53 for generating map images (a map guide image and an arrow guide image) on the basis of the map information, a VRAM 54 for storing the images generated by the display controller, a menu/list generating unit 55 for generating menu image/various list images, a synthesizing unit 56 for synthesizing images from the VRAM 54 and the menu/list generating unit 55, a monitor (display) 57, a voice interface for voice communication between the user and system, and a key and screen interface 59 for interfacing with various other input means such as hard keys and joystick on a panel of the system or a touch screen of the system, and the like.

FIGS. 5A–5F show a typical process and display examples involved in the conventional technology for specifying a destination in the navigation system. In FIG. 5A, the navigation system displays a "Find Destination by" screen 62 where a menu list 64 of various input methods is illustrated for specifying a destination. Suppose a particular address of the destination is "1220 GABACHO, LOS ANGELES", and there is no prior record of this address used and registered for reuse in the navigation system, a user selects "Address" as an input method.

Then, in FIG. 5B, the navigation system displays a "Find Address by" screen 66 where a menu list 67 for selecting either a city name or a street name is illustrated. When selecting the "Street Name", the navigation system displays an "Input Street Name" screen 69 which includes a keyboard 70. For example, the navigation system uses an incremental matching method so that street names matching the characters incrementally input to the keyboard 70 will be displayed in a name list 72. Thus, in this case, when the user inputs "GA" in a window 71, the name list 72 includes the intended street name "GABACHO" among other names.

When selecting the street name "GABACHO", the navigation system displays an "Input Address Number" screen 74 for inputting an address number. In this example, the screen 74 includes a window 75 for address number and the keyboard 70. The user inputs the address number "1220" in the window 75 in FIG. 5E, and hits a "Done" button on the keyboard 70.

Figure 1A:
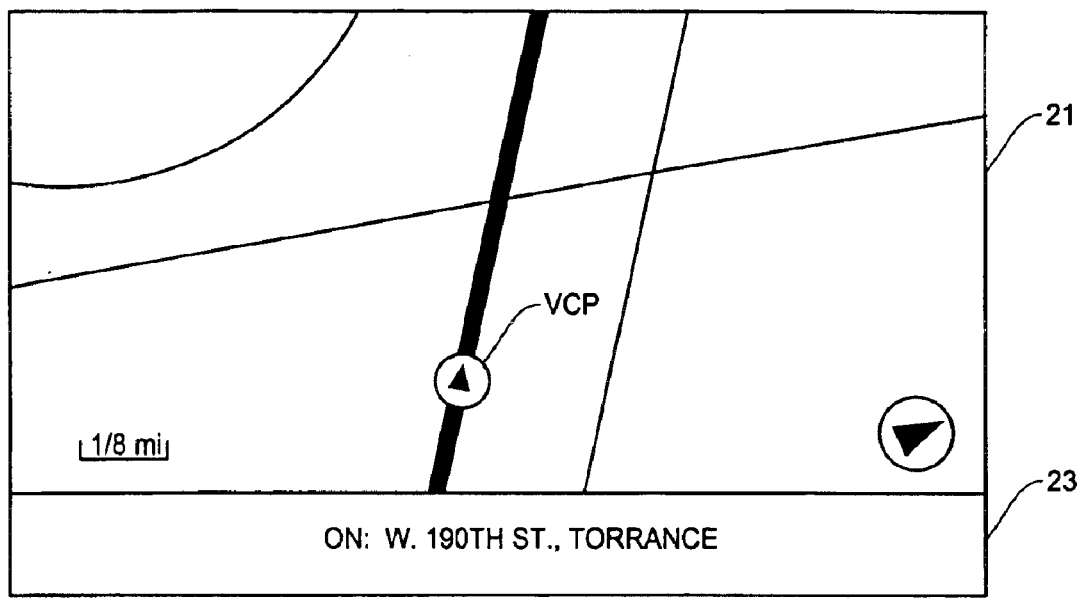
FIGS. 1A and 1B are schematic diagrams showing an example of locator map display and route guidance display, respectively, of a navigation system.
Figure 1B:
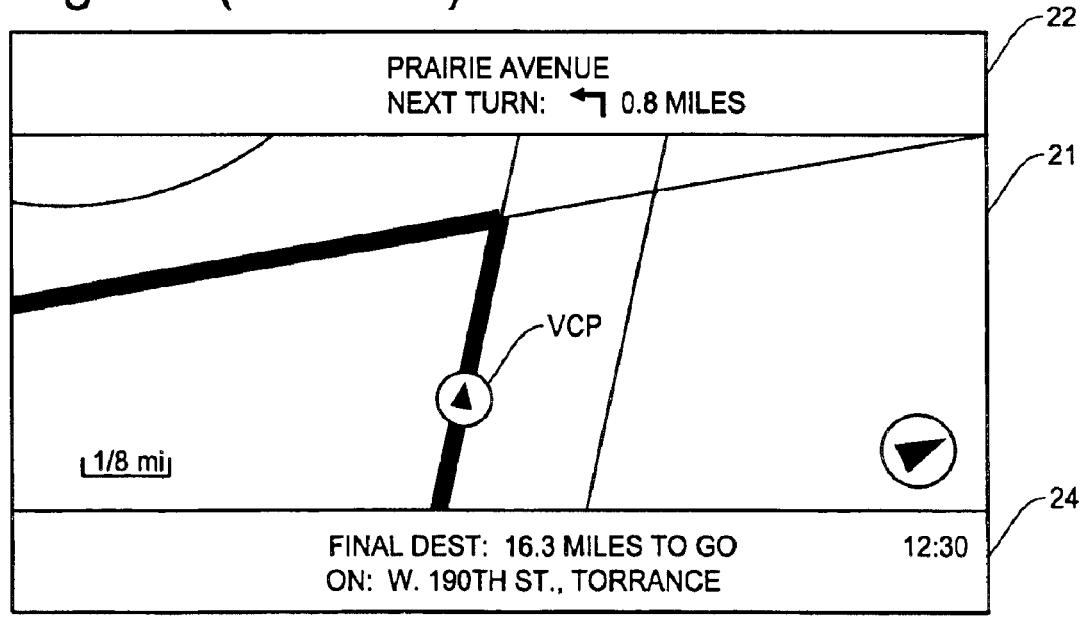
Figure 2D:
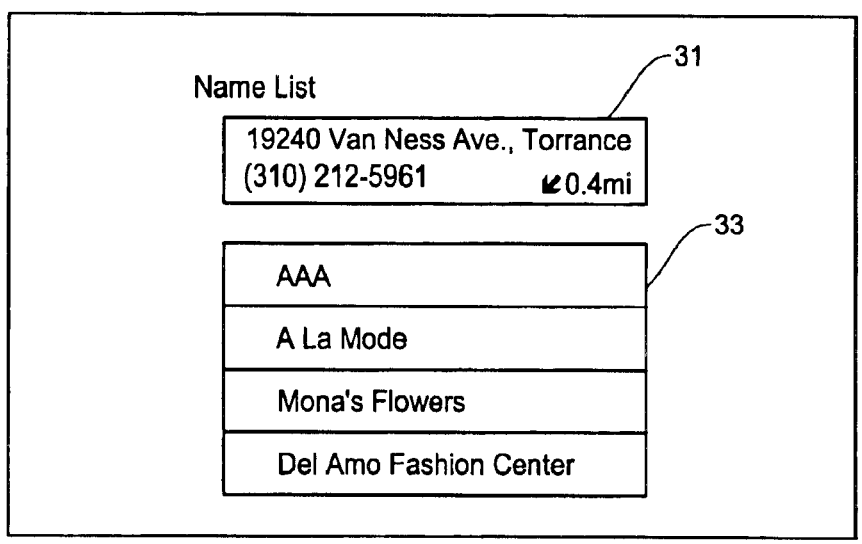
Figure 2E:
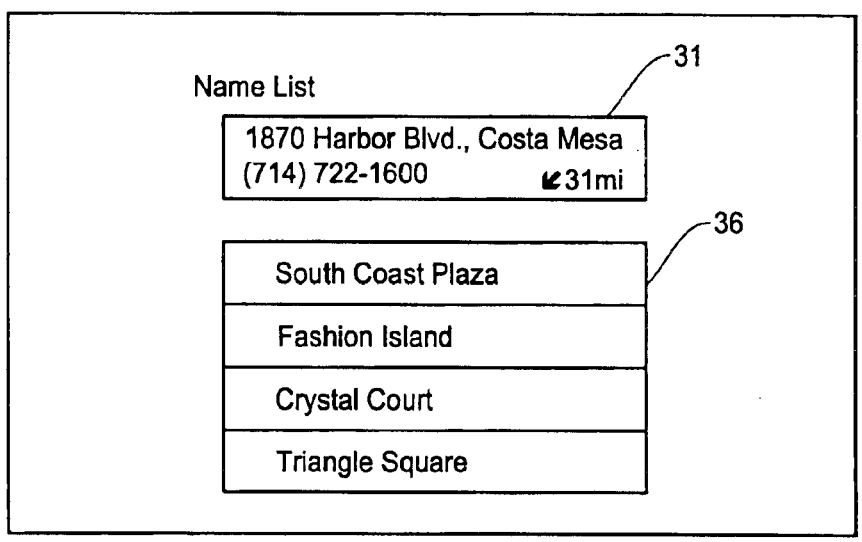
Figure 2F:
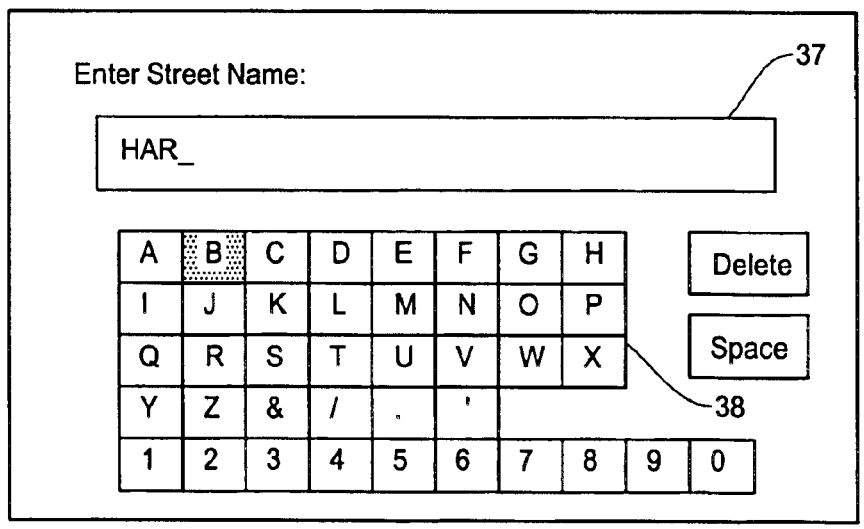

The navigation system displays a "Confirmation Destination" screen 82 in FIG. 5F for confirming the address recognized by the navigation system. The screen 82 includes an address box 83 describing the address of the destination and a menu list 84 for selecting the next process. If the address in the address box 84 is correct, the user selects "OK to Proceed". The navigation system moves to the route calculation process (not shown). After determining the appropriate route to the destination, the navigation system displays the route guidance screen such as shown in FIG. 1B to guide the user to the destination.

The above process in FIGS. 5A–5F is appropriate when the user knows the exact address of the destination. However, in many cases, a user knows the name of the street but does not know the address number. In such a case, even though the user does not know the address number, he may be able to pin point the correct location or almost correct location on the street map by his past experience and/or surrounding circumstances. Thus, when the user is familiar with the map surrounding the destination, he can quickly specify the address number through the map rather than using the keyboard.

The present invention is directed to such a situation where a user wants to find an address number on the street map and is designed to easily find a location on the image of the selected street. FIGS. 6–15 show the preferred embodiments of the present invention. In the present invention, the destination is specified starting from street name selection process and then moves to a map screen for searching for a location of the destination on the street image rather than inputting the address number through the keyboard.

The process shown in FIGS. 6A–6C corresponds to the process of FIGS. 5A–5C. Namely, in FIG. 6A, the navigation system displays the "Find Destination by" screen 62 and a user selects "Address" in the list 64 as an input method. In FIG. 6B, the navigation system displays the "Find Address by" screen 66 and the user selects "Street Name" in the list 67. In the "Input Street Name" screen 69 of FIG. 6C, the user inputs the street name through the keyboard 70 and selects the street name "GABACHO".

When selecting the street name "GABACHO", the navigation system displays the "Input Address Number" screen 74 of FIG. 6D for inputting an address number of the street "GABACHO" in the window 75. The difference of the screen 74 in FIG. 6D from the screen in FIG. 5D is that FIG. 6D includes a "Map" menu 76. The map menu 76 is to change the navigation system to a map screen showing an image of the selected street. Thus, in the "Input Address Number" screen of Figure 6D, the user either inputs the address number or moves to the map screen showing the street image. It should be noted that the "Map" menu 76 can be called not only by the "Input Address Number" screen 74 of FIG. 6D but various other means, such as, from other stages of display screen, through the remote controller, voice command, keys on the panel, and the like.

When the user selects the "Map" menu 76, the navigation system displays a "Select Destination" screen 78 of FIG. 6E which includes a map image of the selected street "GABACHO". The selected street "GABACHO" is highlighted on the map screen so that the user can easily find a desired position on the highlighted street. A cursor 80 is also displayed on the map image, for example, at a center of the screen. As described in more detail later, the cursor 80 can be fixedly provided on the screen or movable on the screen. The street selected by the prior process is highlighted on the screen in the manner described later with reference to FIGS. 15A–15C.

When a position of the cursor 80 on the street is selected, the navigation system moves to the "Confirm Destination" screen of FIG. 6F which is the same as that shown in FIG. 5F. Thus, when the user selects the. "OK to Proceed" menu, the navigation system moves to the route calculation process (not shown). After determining the appropriate route to the destination, the navigation system displays the route guidance screen such as shown in FIG. 1B to guide the user to the destination.

FIGS. 7A–7C shows a process for selecting a correct street name when two or more streets having the same street name but different street types exist in an interested area. FIG. 7A shows the "Input Street Name" screen 69 which is the same as that shown in FIG. 6C. By inputting the street name by the keyboard 70, the name of the intended street is displayed in the name list 72. The user selects the street name "GABACHO" in the name list 72.

Suppose there are two or more streets having the street name "GABACHO", the navigation system displays a "Select Street Name" screen 86 which includes a name list 88 listing the street names having the same name with different street types. In this example, the name list 88 includes "GABACHO Avenue", "GABACHO Boulevard", "GABACHO Road" and "GABACHO Street". Thus, the user is able to select a correct street name for his destination in FIG. 7B.

Then, the navigation system displays the "Input Address Number" screen 74 of FIG. 7C which shows the street name "GABACHO Street". This screen is basically the same as that of FIG. 6D and has the "Map" menu 76 to change the navigation system to a map screen showing the selected street image. Thus, in the "Input Address Number" screen of FIG. 7C, the user either inputs the address number or moves to the map screen showing the street image. When selecting the "Map" menu 76, the navigation system changes to the map screen such as shown in FIG. 6E. The selected street is highlighted on the map screen so that the user can easily find a desired position on the street.

As described in the foregoing, the process of FIGS. 7A–7C makes it possible to easily specify the street when there are two or more same streets having the same name exist. The process of selecting the types of street described above can be skipped. In such a case, when the "Map" menu 76 is selected, the navigation system displays the street map, for example, of two or more streets or one by one by the predetermined order.

FIGS. 8A–8C shows a process for selecting a correct street name when there are two or more streets having the same street name but different street prefixes. FIG. 8A shows the "Input Street Name" screen 69 which is the same as that shown in FIG. 7A. By inputting the street name on the keyboard 70, the name of the intended street is displayed in the name list 72. The user selects the street name "GABACHO" in the name list 72.

Suppose there are two or more streets having the street name "GABACHO", the navigation system displays a "Select Street Name" screen 86 which includes a name list 88 listing the street names having the same name with different street prefixes. In this example, the name list 88 includes "N (North) GABACHO", "S (South) GABACHO", "E (East) GABACHO" and "W (West) GABACHO". Thus, the user is able to select a correct street name for his destination in FIG. 8B.

Then, the navigation system displays the "Input Address Number" screen 74 of FIG. 8C which shows the selected street name "South GABACHO". This screen is basically the same as that of FIG. 7C and has the "Map" menu 76 to change the navigation system to a map screen showing the selected street image. Thus, in the "Input Address Number" screen of FIG. 8C, the user either inputs the address number or moves to the map screen showing the street image. When selecting the "Map" menu 76, the navigation system changes to the map screen such as shown in FIG. 6E.

As described in the foregoing, the process of FIGS. 8A–8C makes it possible to easily specify the street when there are two or more streets having the same name within the search range. The process of selecting the types of street described above can be skipped. In such a case, when the "Map" menu 76 is selected, the navigation system displays the street map, for example, of two or more streets or one by one by the predetermined order.

FIGS. 9A–9C shows a process for selecting a range of street image in the map screen when the navigation system displays the map image of the selected street. FIG. 9A shows the "Input Street Name" screen 69 which is the same as that shown in FIGS. 7A and 8A. By inputting the street name through the keyboard 70, the name of the intended street is displayed in the name list 72. The user selects the street name "GABACHO" in the name list 72.

Then, the navigation system displays the "Input Address Number" screen 74 of FIG. 9B which shows the street name "GABACHO" to input the address number in the window 75. This screen also shows the "Map" menu 76 and selection boxes 73. As noted above, the "Map" menu 76 is provided to change the navigation system to a map screen showing the selected street image. The selection boxes 73 are provided to select a range of address numbers, rather than one specific address number, of the selected street to be displayed when the "Map" menu 76 is activated.

If a selected street is discontinuous and thus has two or more segments or when a selected street has a long distance, it is sometimes not convenient for a user to find a location on the street if the street as a whole is displayed on the screen. Thus, a user may prefer to see the portion of the street image rather than the whole street image to easily trace the location on the street. Therefore, as noted above, the navigation system displays the selection boxes 73 for selecting address number ranges in addition to the "Map" menu 76. In this example, the display includes two selection boxes 73 showing different ranges of address numbers although more small segments of range with more selection boxes are also possible. Thus, the user is able to select a range of address numbers for his destination in FIG. 9B.

When the user selects the "Map" menu 76, the navigation system displays the "Select Destination" screen 78 of FIG. 9C which includes a map image of the selected street "GABACHO" with the selected range. The street selected by the prior process is highlighted on the screen so that the user can easily find a location on the street. Since the screen 78 in FIG. 9C shows the selected range of the selected street, the user can easily position the cursor 80 on the desired location on the selected street. When a position of the cursor 80 on the street is determined by the user, the navigation system moves to the "Confirm Destination" screen as shown in FIG. 6F and moves to the route guidance screen mode such as shown in FIG. 1B.

FIGS. 10A–10C shows another example of process for selecting a range of street image in the map screen when navigation system displays the selected street image. FIG. 10A shows the "Input Street Name" screen 69 which is the same as that shown in FIGS. 7A, 8A and 9A. By inputting the street name on the keyboard 70, the name of the intended street is displayed in the name list 72. The user selects the street name "GABACHO" in the name list 72.

Then, the navigation system displays the "Input Address Number" screen 74 of FIG. 10B which shows the street name "GABACHO". This screen also shows the "Map" menu 76 and selection boxes 77. As noted above, the "Map" menu 76 is provided to change the navigation system to a map screen showing the image of the selected street. The selection boxes 77 are provided to select an area or other parameters to limit a range of address numbers of the selected street to be displayed when the "Map" menu 76 is activated.

If a selected street extends to a wide area such as two or more cities, it is convenient for a user to limit the street to a particular area such as a city. Alternatively, a user may want to see only portions of the street image that are associated with certain points of interest or cross streets, etc. Therefore, as noted above, the navigation system displays the selection boxes 77 for selecting address number ranges in addition to the "Map" menu 76.

In this example, the display includes two selection boxes 77, i.e., parameters of "Within City" and "Near POI". The "Within City" box 77 is to select the range of the street within the city and the "Near POI" box 77 is to select the range of the street close to particular points of interest. Other possible parameters include "near a cross street", "within a district", and "near freeway". Thus, the user is able to select a range of address number for his destination in FIG. 10B.

When the user selects the "Map" menu 76, the navigation system displays the "Select Destination" screen 78 of FIG. 10C which includes a map image of the selected street "GABACHO" with the selected range. The street selected by the prior process is highlighted on the screen so that the user can easily find a location on the street. Since the screen 78 in FIG. 10C shows the selected range of the selected street, the user can easily position the cursor 80 on the desired location on the street. When a position of the cursor 80 on the street is determined by the user, the navigation system moves to the "Confirm Destination" screen as shown in FIG. 6F and moves to the route guidance screen mode such as shown in FIG. 1B.

Figure 11A:
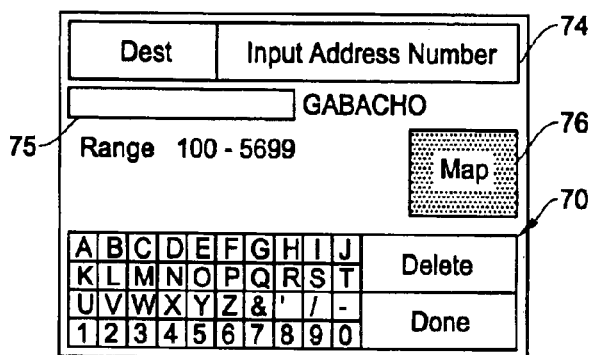
FIGS. 11A–11E are display examples showing initial map scales when a keyboard screen is switched to a map screen, and map zoom screens when a user activates a zoom key for changing the map scale.
Figure 11B:
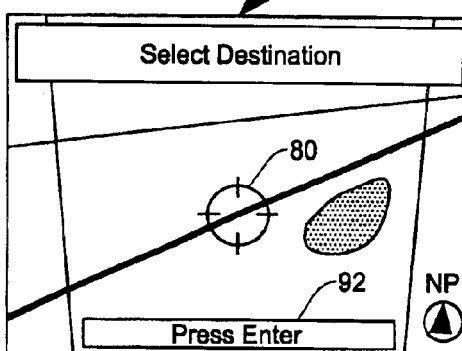
Figure 11C:
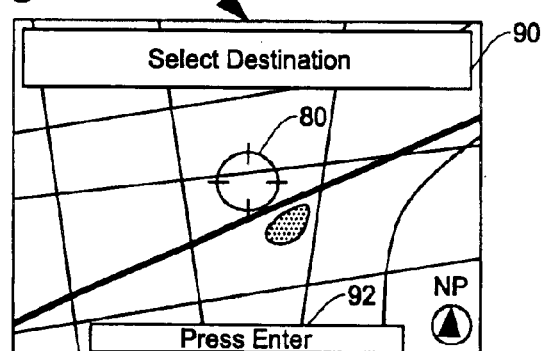

FIGS. 11A–11E show display examples with respect to map scales and map zooming when the navigation system is changed from the keyboard screen to the map screen. FIG. 11A shows the "Input Address Number" screen 74 in which a user is able to select either to input the address number or to change the display to the map screen as noted above. When the user selects the "Map" menu 76 in FIG. 11A, the navigation system displays the map screen as shown in FIGS. 11B and 11C.

During this process, the navigation system selects the map scale (initial zoom level) in response to a type of street selected or a range of address numbers selected, etc. Therefore, when the display is changed to the map screen in FIG. 11B or 11C, the size of the screen is automatically set to be convenient for the user. For example, when the selected street is a freeway, a smaller scale such as 20 mile/inch or more will be selected. In contrast, when a local street is selected, a larger scale such as 2 mile/inch will be selected. FIG. 11B shows a case when the map scale is large (high zoom) and FIG. 11C shows a case when the map scale is small (low zoom).

Figure 11D:
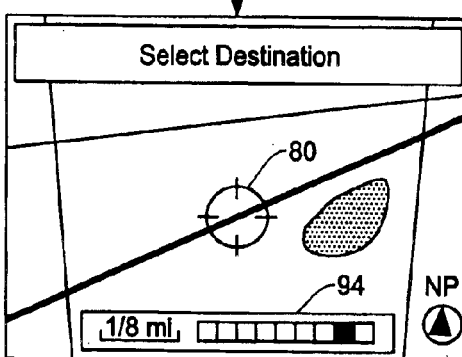
Figure 11E:
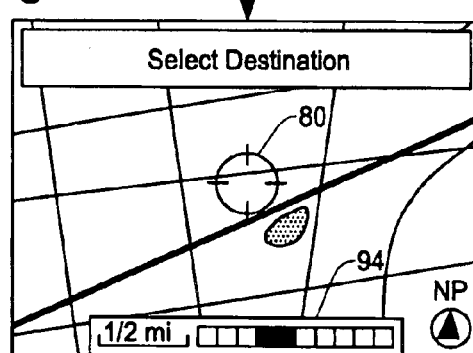

When the user wants to change the map scale from the initial map scale, he operates a zoom key to change the map scale. Then, as shown in FIGS. 11D and 11E, the map screen shows a zoom bar 94 which indicates a zoom level of the current map image. By further pressing the zoom key, the zoom level will be changed accordingly. In this way, the user is able to select the optimum map scale (zoom level) and search the position on the selected street. When a position of the cursor 80 on the street is determined by the user, the navigation system shifts to the "Confirm Destination" screen as shown in FIG. 6F and moves to the route guidance screen mode such as shown in FIG. 1B.

Figure 12A:
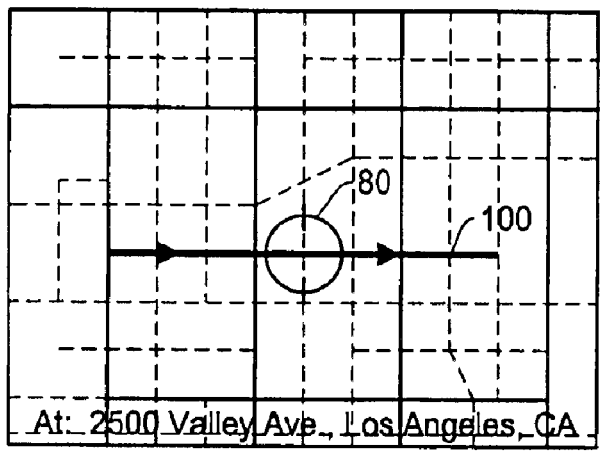
FIGS. 12A–12C are diagrams showing display examples for scrolling a map image to find a position of the destination on the selected street in accordance with the present invention.
Figure 12B:
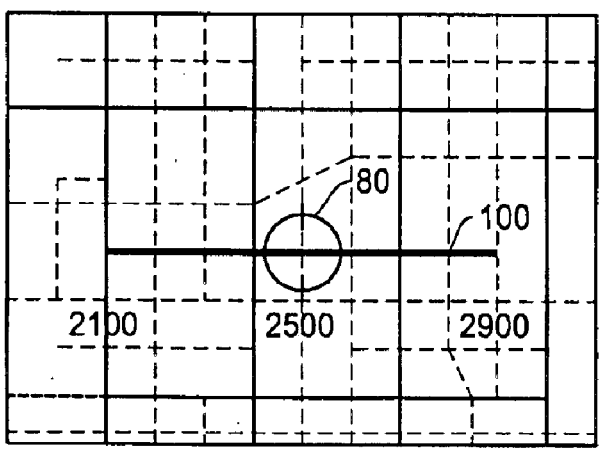
Figure 12C:
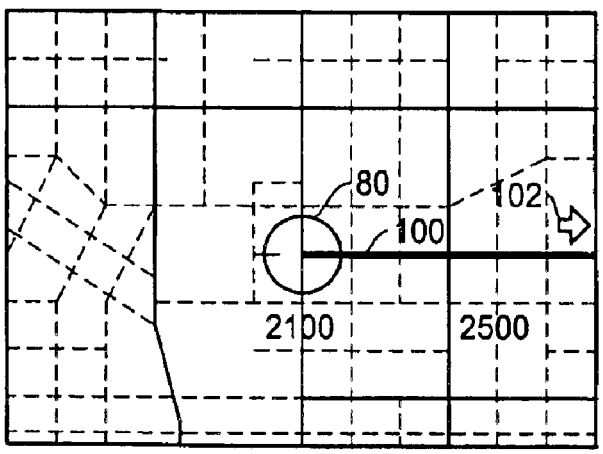

FIGS. 12A–12C are display examples showing various methods of illustrating the selected street image on the map screen. The examples of FIGS. 12A–12C are provided, preferably as initial map screens, so that the user is able to easily locate the position on the street image. Thus, the user scrolls the map image from the initial scroll positions illustrated in these examples. As noted above, the user will define the position on the image of the selected street by pointing the cursor 80, thereby defining the address number of the selected street. The selected street is highlighted on the map screen so that the user can easily trace the locations on the selected street.

In the example of FIG. 12A, a street image 100 is illustrated in such a way that the center of the image of the selected street is positioned at the cursor position. In the examples of FIGS. 12A–12C, the cursor 80 is fixedly provided at the center of the screen. The arrow on the street image 100 indicates an ascending order of the address number of the selected street. The address of the cursor point is also shown at the bottom of the screen. The user scrolls the map image to determine the desired cursor position on the street image 100.

In the example of FIG. 12B, similar to the example of FIG. 12A, the street image 100 is illustrated so that the center of the street image 100 is positioned at the cursor position. The cursor 80 is fixedly provided at the center of the map screen. Major ranges of the address numbers are provided on the street image 100 although the arrows of FIG. 12A are no longer used. The user scrolls the map image to determine the desired cursor position on the street image 100, thereby specifies the destination.

In the example of FIG. 12C, the initial scroll position is set so that the beginning of the street image 100 is located at the center of the screen, i.e., the cursor position. The cursor 80 is fixedly provided at the center of the map screen. Major ranges of the address numbers are provided on the street image 100 similar to the example of FIG. 12B. An arrow 102 indicates that there is an out-of-screen range of the street image 100. The user scrolls the map image by a joystick, direction buttons or a rotary encoder along the highlighted street toward the direction of the arrow 102, for example, to determine the cursor position on the street image 100, thereby specifies the destination.

Figure 13A:
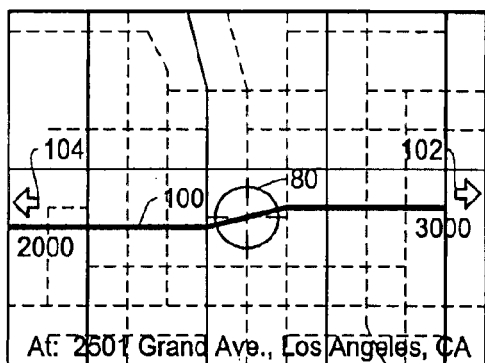
FIGS. 13A and 13B are diagrams showing display examples for scrolling a map image to find a position of the destination on the selected street in accordance with the present invention when the street is discontinuous.
Figure 13B:
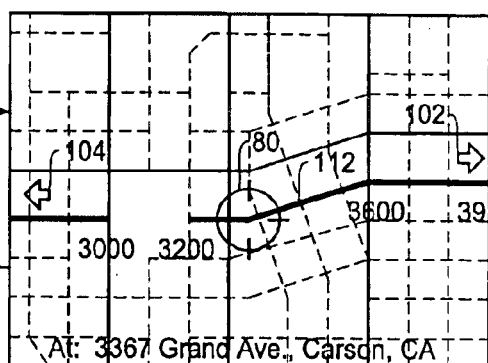

FIGS. 13A and 13B are display examples showing other methods of illustrating the selected street image on the map screen. The examples of FIGS. 13A and 13B show a case where the selected street is discontinuous so that it has a gap between the segments. To determine the location on the street, the user scrolls the map image from the initial scroll position by operating the scroll key, rotary encoder, or joystick, etc. In the example of FIGS. 13A and 13B, the cursor 80 is fixedly displayed at the center of the map screen. As noted above, the user will define the position on the highlighted street image by pointing the cursor 80, thereby specifying the address number of the selected street. The address of the cursor point is indicated at the bottom of the map screen.

In the example of FIG. 13A, the street image 100 is provided with major ranges of the address numbers. The segment of the street 100 shown in FIG. 13A is terminated at the address number "3000". Arrows 102 and 104 show that there are further street images outside the screen in the directions indicated. Thus, the user scrolls the map image in the direction of the arrow 102 or 104.

When further scrolling the map toward the direction of the arrow 102, the other segment of the street 100 will be displayed as shown in FIG. 13B. Because the street 100 is discontinuous and has a gap, the map scroll position jumps from the address number 3000 to the address number 3200 when the user scrolls the map image by a joystick, direction buttons or a rotary encoder along the highlighted street. The navigation system continues to display the arrows 102 and 104 on the screen of FIG. 13B as long as there are further street images outside the screen in the directions of the arrows.

Figure 14A:
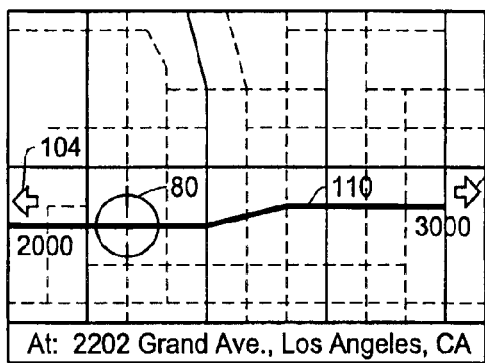
FIGS. 14A and 14B are diagrams showing display examples for changing a cursor position on the selected street to find a position of the destination on the street in accordance with the present invention.
Figure 14B:
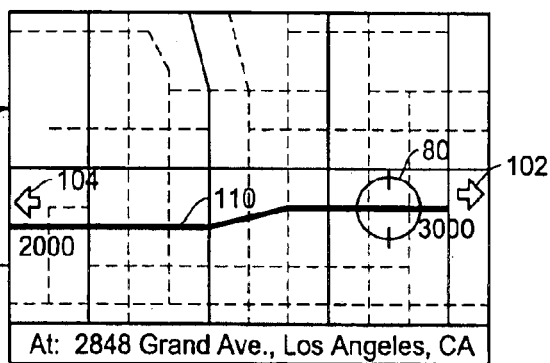

FIGS. 14A and 14B are display examples showing alternative methods of illustrating the selected street image on the map screen and searching for the location on the street. In this example, the cursor 80 is moved on the selected street in response to the user operation of the joystick, rotary encoder, direction buttons or other means. The map screen can be either fixed or movable, although preferably, the map is fixed when the cursor 80 is moved, which simplifies the overall process for finding the location.

In FIGS. 14A and 14B, the address of the cursor point is indicated at the bottom of the map screen. Similar to the examples of FIGS. 12 and 13, the highlighted street 100 is provided with major ranges of the address numbers. The segment of the street 100 shown in FIG. 14A ends at the address number "3000". Arrows 102 and 104 show that there are further street images outside the screen in the directions indicated. As noted above, preferably, the map screen is fixed when the cursor 80 is moved. When the cursor 80 is further moved toward the direction of the arrow 102 at the address number "3000", the next map screen showing the other segment of the street 100 will be displayed such as shown in FIG. 13B, i.e, a new page of the map screen is fixedly displayed.

Figure 15A:
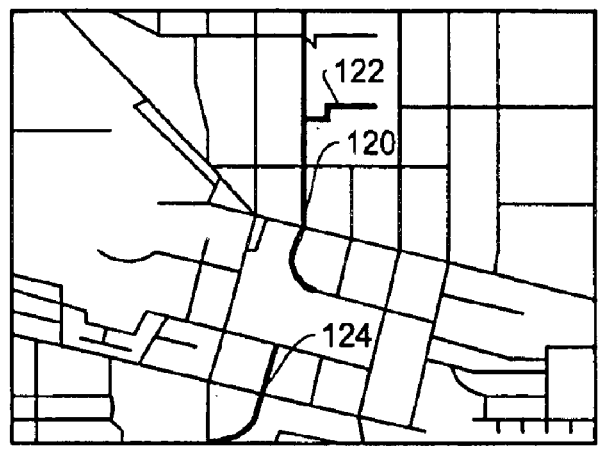
FIGS. 15A–15C are diagrams showing display examples for highlighting a street image on the map to find a position of the destination on the street in accordance with the present invention.
Figure 15B:
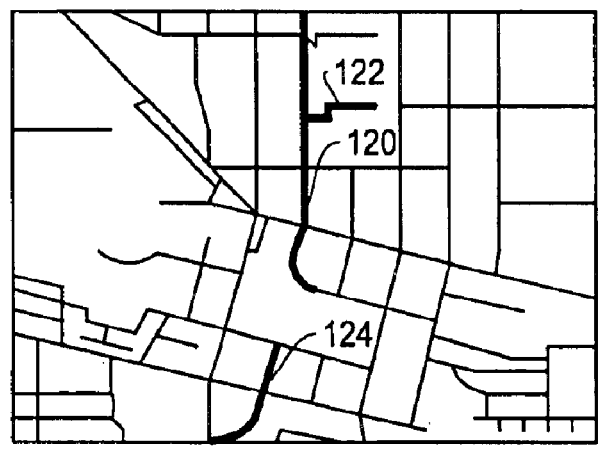
Figure 15C:
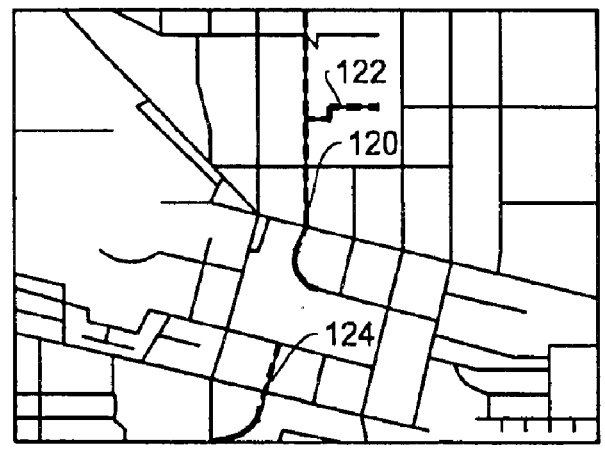

FIGS. 15A–15C are display examples showing further methods of illustrating the selected street image on the map screen. More specifically, these examples provide various methods of highlighting the selected streets. Thus, the user can trace along the highlighted streets to easily select the particular street such as a branch street. In FIG. 15A, a single solid color is used for a street 120 and 124 while a different color can be used for a branch street 122. The example of FIG. 15B uses a wider line or brighter color than that of the other streets. A blinking color can also be used. FIG. 15C shows an example which employs alternate broken colors or broken line with alternate colors for highlighting the street image.

As has been described, according to the present invention, the vehicle navigation system enables the user to determine the destination easily and quickly. First, the user selects the particular name of the street with use of the keyboard, then changes to the map screen displaying the image of the selected street. The user is able to find a position on the selected street in the map screen to determined the specific address of his destination.

The navigation system of the present invention enables the user to easily and quickly change the navigation system to the map image of the selected street for finding and specifying the destination on the map image. The user can easily and quickly find a position on the map image of the selected street. The various display methods provided in the navigation system promote easy and quick operations for selecting the destination on the map image.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A display method for a navigation system, comprising the following steps of:

displaying a keyboard for inputting a street name of a destination;

displaying a street name selected by a user and a map menu for changing a current screen to a map screen;

changing the current screen to the map screen which displays an image of the street selected by the user and a cursor as a pointing device; and finding a position on the image of the selected street and pointing the position on the selected street by the cursor, thereby determining an address of the destination;

wherein said step of changing the current screen to said map screen including a step of displaying the image of said selected street in such a way that a start point of said selected street matches a center of the map screen.

2. A display method for a navigation system as defined in claim 1, wherein said step of displaying the street name and the map menu includes a step of, when there are two or more streets having same street name with different street types or street prefixes, displaying selection means for selecting one of the streets.

3. A display method for a navigation system as defined in claim 1, wherein said step of changing the current screen to said map screen including a step of highlighting the image of the selected street in the map screen.

4. A display method for a navigation system as defined in claim 1, wherein said step of displaying the street name selected by the user including a step of displaying selection means for selecting a range of address numbers of the selected street.

5. A display method for a navigation system as defined in claim 4, wherein said step of displaying the selection means for selecting the range of address numbers including a step of displaying a numerical range of the address numbers as the selection means.

6. A display method for a navigation system as defined in claim 4, wherein said step of displaying the selection means for selecting the range of address numbers including a step of displaying an area of specific interest as the selection means.

7. A display method for a navigation system as defined in claim 1, wherein said step of changing the current screen to said map screen including a step of selecting a map scale in the map screen based on a type of said selected street.

8. A display method for a navigation system as defined in claim 1, wherein said step of changing the current screen to said map screen including a step of selecting a map scale in the map screen based on a range of address numbers of said selected street specified by a user.

9. A display method for a navigation system as defined in claim 1, wherein said step of finding and pointing the position on said selected street including a step of at least one of scrolling and zooming said map screen.

10. A display method for a navigation system as defined in claim 1, wherein said step of changing the current screen to said map screen including a step of displaying the image of said selected street in such a way that a center of said selected street matches a center of the map screen and wherein the cursor is positioned at the center of the map screen.

11. A display method for a navigation system as defined in claim 1, wherein the cursor is positioned at the center of the map screen.

12. A display method for a navigation system as defined in claim 1, wherein said step of finding and pointing the position on said selected street including a step of displaying an address of a cursor point on said selected street.

13. A display method for a navigation system as defined in claim 1, wherein said step of finding and pointing the position on said selected street including a step of moving the cursor on the image of said selected street while maintaining the map screen without change.

14. A display method for a navigation system as defined in claim 1, wherein said step of changing the current screen to said map screen including a step of assigning a color to the image of said selected street where two or more colors are assigned for differentiating between a main street and a branch street of said selected street.

15. A display method for a navigation system as defined in claim 1, wherein said step of changing the current screen to said map screen including a step of alternating two or more colors of said selected street or blinking a color of said selected street to highlight the image of said selected street.

16. A display method for a navigation system, comprising the following steps of:

displaying a keyboard for inputting a street name of a destination;

displaying a street name selected by a user and a map menu for changing a current screen to a map screen;

changing the current screen to the map screen which displays an image of the street selected by the user and a cursor as a pointing device; and finding a position on the image of the selected street and pointing the position on the selected street by the cursor, thereby determining an address of the destination;

wherein said step of finding and pointing the position on the selected street including a step of displaying means for indicating existence of a further image of said selected street outside of a current map screen.

17. A display method for a navigation system, comprising the following steps of:

displaying a keyboard for inputting a street name of a destination;

displaying a street name selected by a user and a map menu for changing a current screen to a map screen;

changing the current screen to the map screen which displays an image of the street selected by the user and a cursor as a pointing device; and finding a position on the image of the selected street and pointing the position on the selected street by the cursor, thereby determining an address of the destination;

wherein said step of finding and pointing the position on said selected street including a step of jumping from one segment of said selected street to another segment of said selected street when there is a gap in said selected street.

18. A display apparatus for a navigation system, comprising:
- means for displaying a keyboard for inputting a street name of a destination;
- means for displaying a street name selected by a user and a map menu for changing a current screen to a map screen;
- means for changing the current screen to the map screen which displays an image of the street selected by the user and a cursor as a pointing device; and
- means for finding a position on the image of the selected street and pointing the position on the selected street by the cursor, thereby determining an address of the destination;
- wherein said means for changing the current screen to said map screen including means for displaying the image of said selected street in such a way that a start point of said selected street matches a center of the map screen and wherein the cursor is positioned at the center of the map screen.

19. A display apparatus for a navigation system as defined in claim 18, wherein
said means for displaying the street name and the map menu includes means for, when there are two or more streets having the same street name with different street types or street prefixes, displaying selection means for selecting one of the streets.

20. A display apparatus for a navigation system as defined in claim 18, wherein said means for changing the current screen to said map screen including means for highlighting the image of the selected street in the map screen.

21. A display apparatus for a navigation system as defined in claim 18, wherein said means for displaying the street name selected by the user including means for selecting a range of address numbers of said selected street based on a numerical range of the address numbers or an area of specific interest.

22. A display apparatus for a navigation system as defined in claim 18, wherein said means for changing the current screen to said map screen including means for selecting a map scale in the map screen based on a type of said selected street or a range of address numbers of said selected street.

23. A display apparatus for a navigation system as defined in claim 18, wherein said means for finding and pointing the position on said selected street including means for at least one of scrolling and zooming said map screen.

24. A display apparatus for a navigation system as defined in claim 18, wherein said means for changing the current screen to said map screen including means for displaying the image of said selected street in such a way that a center of said selected street matches a center of the map screen and wherein the cursor is positioned at the center of the map screen.

25. A display apparatus for a navigation system as defined in claim 18, wherein said means for finding and pointing the position on said selected street including means for displaying an address of a cursor point on said selected street.

26. A display apparatus for a navigation system as defined in claim 18, said means for finding and pointing the position on said selected street including means for moving the cursor on the image of said selected street while maintaining the map screen without change.

27. A display apparatus for a navigation system as defined in claim 18, wherein said means for changing the current screen to said map screen including means for assigning a color to the image of said selected street where two or more colors are assigned for differentiating between a main street and a branch street of said selected street.

28. A display apparatus for a navigation system as defined in claim 18, wherein said means for changing the current screen to said map screen including means for alternating two or more colors of said selected street or blinking a color of said selected street to highlight the image of said selected street.

29. A display apparatus for a navigation system, comprising:
- means for displaying a keyboard for inputting a street name of a destination;
- means for displaying a street name selected by a user and a map menu for changing a current screen to a map screen;
- means for changing the current screen to the map screen which displays an image of the street selected by the user and a cursor as a pointing device; and
- means for finding a position on the image of the selected street and pointing the position on the selected street by the cursor, thereby determining an address of the destination;
- wherein said means for finding and pointing the position on the selected street including means for jumping from one segment of said selected street to another segment of said selected street when there is a gap in said selected street.

* * * * *